US009043256B2

(12) United States Patent
Pan et al.

(10) Patent No.: US 9,043,256 B2
(45) Date of Patent: May 26, 2015

(54) HYPOTHESIS DERIVED FROM RELATIONSHIP GRAPH

(71) Applicant: International Business Machines Corporation, Armonk, NY (US)

(72) Inventors: Yue Pan, Beijing (CN); Wei Jia Shen, Beijing (CN); Xing Zhi Sun, Melbourne (AU); Xiao Fei Teng, Beijing (CN); Lin Hao Xu, Beijing (CN); Yi Qin Yu, Beijing (CN); Yu Chen Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 13/688,323

(22) Filed: Nov. 29, 2012

(65) Prior Publication Data

US 2013/0138592 A1    May 30, 2013

(30) Foreign Application Priority Data

Nov. 30, 2011  (CN) .......................... 2011 1 0409434

(51) Int. Cl.
  *G06N 5/00*  (2006.01)
  *G06F 7/60*  (2006.01)
  *G06N 5/02*  (2006.01)
(52) U.S. Cl.
  CPC . *G06N 5/02* (2013.01); *G06N 5/003* (2013.01)
(58) Field of Classification Search
  None
  See application file for complete search history.

(56) References Cited

U.S. PATENT DOCUMENTS

| 5,378,260 A | * | 1/1995 | Cox et al. ......................... 75/500 |
| 7,729,810 B2 | * | 6/2010 | Bell et al. ...................... 700/295 |
| 2005/0038678 A1 | | 2/2005 | Qian et al. |
| 2007/0239361 A1 | | 10/2007 | Hathaway |
| 2009/0083208 A1 | | 3/2009 | Raghavan et al. |
| 2009/0327195 A1 | * | 12/2009 | Iscen ............................... 706/47 |
| 2010/0049538 A1 | * | 2/2010 | Frazer et al. ..................... 705/1 |
| 2011/0099140 A1 | | 4/2011 | Ridgeway |
| 2011/0191343 A1 | | 8/2011 | Heaton et al. |
| 2011/0231356 A1 | | 9/2011 | Vaidyanathan et al. |

FOREIGN PATENT DOCUMENTS

JP     05-6394 A     1/1993

OTHER PUBLICATIONS

Ping Chena et al., "Hypothesis gen and data quality assessment through association mining", Cognitive Informatics '10 9th IEEE Int'l Conf, Jul. 7-9, 2010, p. 659-666, Beijing.
Chu, "Challenges and techniques for mining real clinical data", Granular Computing, Aug. 26-28, 2008, GrC 2008, p. 2-4, Hangzhou.
Xuan-Hiep Huynh et al., "Evaluting interestingness measures with linear correlation graph", LINA CNRS 2729 polytechnic school of Nantes university, 2006.
Payne et al., Supporting design of translational clinical studies through the gen and verification conceptual knowledge-anchored hypoth, AMIA Annu Symp Proc. 2008, p. 566-570.

* cited by examiner

*Primary Examiner* — Alan Chen
(74) *Attorney, Agent, or Firm* — Jeff Tang

(57) ABSTRACT

A method and apparatus for data processing. The method calculates correlations between a plurality of attributes in a dataset. The attributes are factors involved in transaction processing. The method generates a relationship graph by using the plurality of attributes and the correlations between the plurality of attributes; and extracts a sub-graph from the relationship graph to represent a hypothesis. The hypothesis describes the impacts of the factors on the transaction processing. Also provided is an apparatus for implementing the above data processing method.

21 Claims, 8 Drawing Sheets

HYPOTHESIS DERIVED FROM RELATIONSHIP GRAPH

CROSS-REFERENCE TO RELATED APPLICATION

This application claims priority under 35 U.S.C. §119 from Chinese Patent Application No. 201110409434.3 filed Nov. 30, 2011, the entire contents of which are incorporated herein by reference.

BACKGROUND OF THE INVENTION

1. Field of the Invention

The present invention is related to data processing, and more specifically, to a method and apparatus for calculating correlations in mass data to generate a hypothesis, as well as a corresponding computer program product.

2. Description of the Related Art

A hypothesis can describe the impact of various factors on a transaction processing procedure. For example, the smelting technology for metallic zinc has a smelting scheme that is typically evaluated by a number of factors: such as yield, smelting recovery ratio, water consumption, electricity consumption, sulfuric acid consumption, etc. Other factors are also involved during smelting, such as smelting method, temperature, pressure, response time, impurity content in raw material, equipment service time, etc. In order to determine relatively important factors for improving the overall efficiency of zinc smelting and establish a hypothesis for studying the relation between these relatively important factors and the efficiency of zinc smelting, efforts should be taken to comprehensively collect the multitude of factors and analyze the relationships between respective factors, which is laborious and time-consuming.

The premise of establishing a hypothesis is that the initial research direction on which the hypothesis is based is correct. For example, zinc smelting might be affected by hundreds or thousands of factors, it would take a complex procedure to determine a correlation between each factor and zinc smelting yield. Existing solutions that sample data (for example, values of respective factors during a zinc smelting procedure are sample data) are manually analyzed by seasoned experts who manually establish a hypothesis based on their past experience and collected sample data, e.g., research on impacts of temperature on yield.

The prior art has the following drawbacks: relations between respective factors cannot be analyzed accurately, and especially in case of the number of factors to be analyzed being extremely large (e.g., thousands of), it would be impossible to analyze these factors one by one based on manual processing. Besides, due to the limitation of manual processing capability, the amount of sample data being selected is rather limited; since the accuracy of the analysis cannot be ensured, some important factors might be missed in a hypothesis, or some factors that are irrelevant or weakly correlated could be mistaken as important factors and introduced into the hypothesis. For example, "equipment service time" might have a significant impact on the efficiency of smelting. However, if a hypothesis dedicated to the relationship between "equipment service time" and "yield" is established, and since "equipment service time" actually has little relation to "yield," the hypothesis comes to nothing. A cause behind such an error might be neglect of a certain important factor or intervention of other factors. Once an unrealistic hypothesis is established, huge losses of manpower, material resources, and time will result.

In another example, the factors involved in the research analysis field of clinical data are more complex. Take clinical data related to diabetes as an example, the factors can include: average daily dosage of insulin, last dosage of insulin, type of insulin, patient age, gender, nationality, education, or occupation. Each patient's clinical data is sample data. In order to ensure accuracy, it is usually necessary to collect hundreds of factors and analyze thousands of patients' clinical data. Imagine if data is stored using an ordinary, two-dimensional table which includes rows and columns where each column represents a factor and each row represents sample data of one patient. It would be impossible to correctly analyze the data table comprising hundreds of columns and thousands of rows, based on existing manual methods.

SUMMARY OF THE INVENTION

Accordingly, there is a need for a method of analyzing and processing mass data to accurately and efficiently obtain correlations between the factors involved in transaction processing which can be used to establish a conforming hypothesis. When establishing a hypothesis taking correlations between respective factors into account, it is required to select as much sample data as possible. However, this requirement goes against the processing capability of the prior art.

Therefore, the inability to identify correlations in mass data by manual processing, has resulted in an urgent need regarding how exactly to find the correlations between factors involved in transaction processing and how to generate candidate hypotheses for researchers to use. The present invention provides a method, apparatus, and computer program product for data processing of mass data.

One aspect of the present invention provides a method for data processing, where the method calculates the correlations between a plurality of attributes in a dataset, where the attributes are factors involved in transaction processing, and generates a relationship graph by using the plurality of attributes and the correlations between them; and also can extract a sub-graph from the relationship graph to represent a hypothesis, which describes the impacts of the factors on the transaction processing.

Another aspect of the present invention provides an apparatus for data processing, where the apparatus has means configured to calculate correlations between a plurality of attributes in a dataset, where the attributes are factors involved in transaction processing, means configured to generate a relationship graph by using the plurality of attributes and the correlations between them, and means configured to extract a sub-graph from the relationship graph to represent a hypothesis, which describes the impacts of the factors on the transaction processing.

Another aspect of the present invention provides when these attributes have strong correlations between them can provide researchers assistance in decision making, allowing them to devote their energy to the actual research project instead of analyzing the problem "what are research objects?" Where researchers think it necessary, relations between these attributes can be further explored and studied. In the example of zinc smelting, based on the calculated fact that there exists strong correlations between temperature, pressure, and yield in zinc smelting, the method and apparatus of the present invention can help researchers establish a hypothesis to further analyze and quantize impacts of temperature and pressure on the yield.

Using the present invention, it is possible to reduce the workload of manual operations performed by researchers, assist researchers in the formulation of a research plan, and help them to turn their energy to the research project. In addition, it is possible to decrease the costs of manpower, material resources, and time which are spent in formulating the research plan.

BRIEF DESCRIPTION OF THE DRAWINGS

Features, advantages, and other aspects of various embodiments of the present invention will become more apparent from the following detailed description, when taken in conjunction with the figures illustrate several embodiments of the present invention in an exemplary rather than limiting manner.

DETAILED DESCRIPTION OF THE PREFERRED EMBODIMENT

Various embodiments of the present invention are described in detail below with reference to the figures. The flowchart and block diagrams in the figures illustrate the architecture, functionality, and operation of possible implementations of systems, methods, and computer program products according to various embodiments of the present invention. Each block in the flowchart or block diagrams can represent a module, segment, or portion of code, which includes one or more executable instructions for implementing the specified logical function(s). In some alternative implementations, the functions noted in the block can occur out of the order noted in the figures. For example, two blocks illustrated in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, acts, or combinations of special purpose hardware and computer instructions.

The present invention can now be described in the context of several embodiments. It should be understood that these embodiments are only for enabling those skilled in the art to better understand and further implement the present invention, rather than limiting the scope of the present invention in any form.

Figure 1:
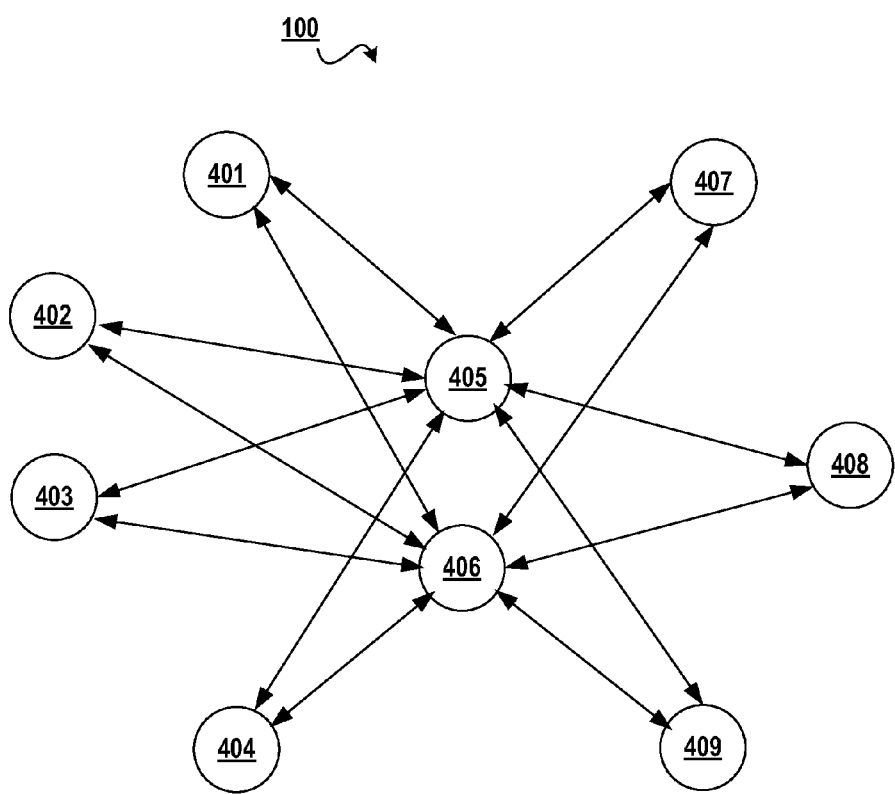
FIG. 1 is a schematic diagram showing dependencies between a plurality of factors involved in data processing.

FIG. 1 schematically illustrates dependencies 100 between a plurality of factors involved during data processing. In FIG. 1, mutual influence between factors 401-409 is depicted by a relationship graph. For example, an edge between node 401 and node 405 indicates a relation between factor 401 and factor 405, i.e., it is necessary to analyze whether there is a dependency between factor 401 and factor 405. Node 401 is connected with node 405 and node 406, respectively, which indicates that attribute 401, is related to attribute 405 and attribute 406, respectively. For another example, node 405 is connected with nodes 401-404 and 407-409, respectively, which indicates that attribute 401, is related to attributes 401-404 and 407-409, respectively. In the particular scenario illustrated in FIG. 1, a usual solution for establishing a hypothesis is to manually analyze relationship graph 100 and seek dependencies between respective factors to select factors with relatively strong correlations as research objects.

For a given dataset, it is desired to efficiently, accurately, and automatically obtain a meaningful hypothesis existing in the dataset, so researchers can obtain decision information by analyzing the hypothesis. For example, when confronted with complicated dependencies between factors as illustrated in FIG. 1, researchers are aware that these factors will exert an impact on transaction processing, but they have no idea how these factors affect the transaction processing. Even if researchers hope to establish a hypothesis for analyzing relations between factors, they will not be able to, because the researchers are unclear about concrete research objects, i.e., attributes whose relationships are subjected to research.

Figure 2:
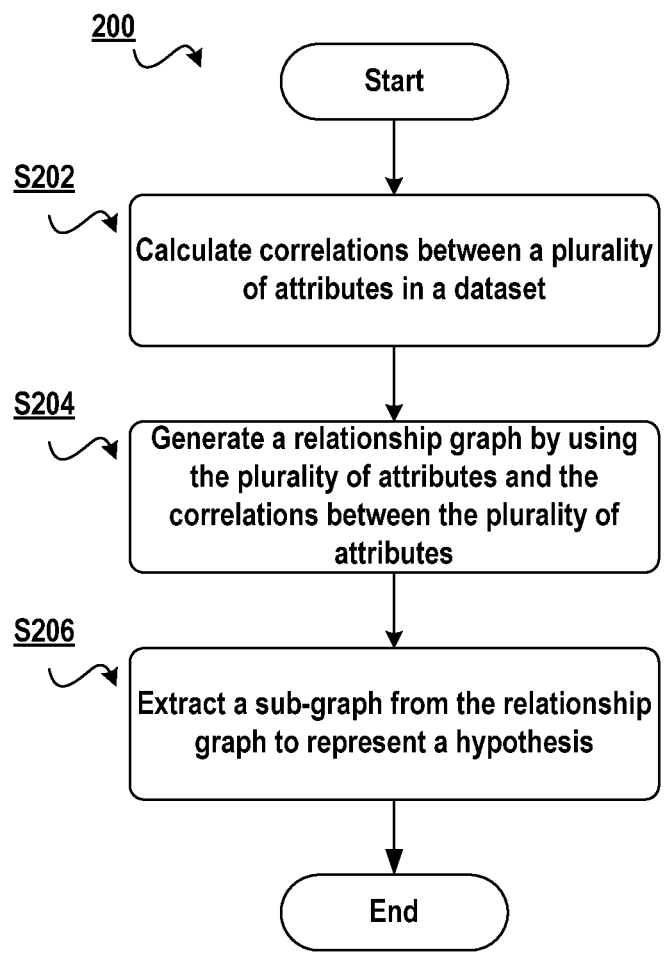
FIG. 2 is a schematic diagram showing a flowchart of a method for data processing in an embodiment of the present invention.

According to the method and apparatus of the present invention, it is possible to disentangle dependencies between factors during transaction processing. FIG. 2 schematically illustrates flowchart 200 of a method for data processing according to one embodiment of the present invention. Specifically, FIG. 2 illustrates a flowchart of a method for generating a hypothesis based on correlations between attributes. In step S202, correlations between a plurality of attributes in a dataset are calculated, where attributes are factors involved during transaction processing. The dataset mentioned here can be represented in various forms. For example, the dataset can be stored using the above-mentioned ordinary, two-dimensional table comprising rows and columns, where each column represents an attribute and each row represents sample data. Further, those skilled in the art can use other storage structures to represent the dataset, for example, representing an attribute as a row and representing sample data as a column; or when the dataset is relatively large-scale, it can be stored using a plurality of tables in a database. For example, regarding the zinc smelting processing in the foregoing example, its dataset can be represented using a data structure schematically illustrated in Table 1 below.

TABLE 1

Dataset for Zinc Smelting Procedure

| Sample Number | Yield | Smelting Recovery | Electricity Consumption | ... | Temperature |
|---|---|---|---|---|---|
| 1 | | | 100 degrees | | 70° C. |
| 2 | | | 125 degrees | | 80° C. |
| ... | | | ... | | |
| N | | | 120 degrees | | 75° C. |

In step S204, a relationship graph is generated using a plurality of attributes and correlations. The present invention describes a hypothesis based on a relationship graph of attributes where an attribute is represented by a node and a correlation between two attributes is represented by an edge between nodes. When implementing the method of the present invention, efforts are taken to seek a relation between two attributes with a relatively strong correlation and discard a relation between two attributes with a relatively weak correlation, to ensure that there are relatively strong cause-and-effect relationships between attributes in a generated hypothesis.

In step S206, a sub-graph is extracted from the relationship graph to represent a hypothesis, where the hypothesis describes impacts of the factors on transaction processing. As mentioned above, various attributes that will exert impacts on transaction processing should be taken into account as soon as possible during the earlier stage of generating a hypothesis. While generating the hypothesis, it is desired to remove irrelevant attributes and find the most correlated ones so as to provide hypothesis candidates for researchers.

In one embodiment of the present invention, adding metadata to a plurality of attributes will help pre-process the plurality of attributes. Pre-processing can provide convenience for extracting attribute values from the plurality of attributes.

Figure 3:
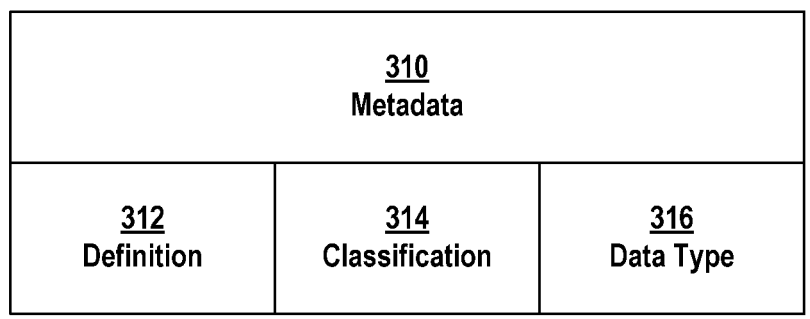
FIG. 3 is a schematic diagram showing a block diagram of metadata in an embodiment of the present invention.

FIG. 3 schematically illustrates block diagram 300 of metadata according to one embodiment of the present invention. As illustrated in FIG. 3, metadata 310 includes: definition 312 for describing basic situation of an attribute (such as name, etc.); classification 314 for describing the function performed by an attribute during transaction processing (e.g., a factor that exerts an impact on other attributes, or a factor that is changed due to impacts of other factors, etc.); and data type 316 for denoting the type of attribute value (e.g., scale denoting age, nominal denoting gender).

In one embodiment of the present invention, classifications of the attributes include: performance indicator, intervention, and confounder. The performance indicator is a factor describing the overall operating conditions of transaction processing. In the example of zinc smelting, yield, smelting recovery, water consumption, electricity consumption, and others are performance indicators describing whether the effect of one-time zinc smelting is good or bad. The intervention is a manually controllable factor describing impacts on the performance indicator during transaction processing, such as selecting wet smelting, temperature, pressure, etc. The confounder is an objective factor that exerts an impact on the performance indicator and that is usually not under manual control, such as equipment service time, etc.

Regarding the foregoing example of clinical data analysis, attributes may be classified as below:

TABLE 2

Classification of Attributes in Clinical Data Analysis

| | |
|---|---|
| Performance Indicator | average daily dosage of insulin, last dosage of insulin, basic dosage of insulin when per-kilogram body weight is up to standard, expenses |
| Intervention | type of insulin, blood sugar test frequency, using pump from which day of admission |
| Confounder | age, gender, nationality, education, occupation, body mass index, waist size, hip size, systolic pressure, diastolic pressure, with or without oral hypoglycemic agents, duration of diabetes, the number of inpatient treatments |

In one embodiment of the present invention, data types of the attributes include: scale, nominal, and ordinal. The scale indicates that data is consecutive, has the same interval between them, and is measurable and magnitude-distinguishable, such as age. The nominal indicates that data is not consecutive, immeasurable, and magnitude-undistinguishable. And the ordinal indicates that data is not consecutive, immeasurable, but magnitude-distinguishable.

According to one embodiment of the present invention, for dividing data types of attributes, different methods can be used to calculate correlations based on the difference of data types. For example, a method for calculating two attributes whose data types are scale may differ from a method for calculating two attributes whose data types are nominal, which will be described in detail below.

In one embodiment of the present invention, calculating correlations between a plurality of attributes in a dataset includes: calculating a correlation between an attribute with a classification of the performance indicator and an attribute with a classification of intervention; and calculating a correlation between an attribute with a classification of performance indicator and an attribute with a classification of confounder.

The basis for classifying attributes has been presented above. However, during transaction processing, researchers are most concerned about attributes which affect the performance indicator, and desire to learn about the degree of impacts exerted by these attributes. It is necessary to calculate respective correlations between the performance indicator and the intervention, and between the performance indicator and the confounder.

For the example of zinc smelting, under the same temperature (intervention), due to equipment aging, equipment service times (confounder) differ, and in turn, yields (performance indicator) differ. For the clinical data analysis example, even with the same type of insulin (intervention), average daily dosages of insulin (performance indicator) might differ because patients' weight mass indexes (confounder) are different. There is a need to calculate a correlation between performance indicator and intervention, and between performance indicator and confounder, respectively.

In one embodiment of the present invention, calculating correlations between a plurality of attributes in a dataset includes: a first and a second attribute among the plurality of attributes, calculating a correlation based on a value of the first attribute and a value of the second attribute in each of a plurality of samples. It is possible to calculate a correlation based on data types of the first and second attributes. For example, the calculation can be performed using the method illustrated in Table 3 below. It should be noted that "ordinal" is a special type of "nominal," so in Table 3 discrimination is not made for "ordinal," but both "nominal" and "ordinal" are processed as the "nominal" data type. It should be further noted that the present invention makes it possible to generate a hypothesis based on correlations between attributes, but does not focus on the principle and algorithm of statistics involved, which are not detailed here accordingly.

TABLE 3

Calculate Correlations Based on Data Types of Attributes

| Type | Condition | Method |
|---|---|---|
| Scale - scale | Both normal distribution | Pearson Correlation method |
| | Otherwise | Spearman Correlation method |

TABLE 3-continued

Calculate Correlations Based on Data Types of Attributes

| Type | Condition | | Method |
|---|---|---|---|
| Scale - nominal | 2-value nominal | Normal distribution | Independent t-test method |
| | | Otherwise | Mann-Whitney test method |
| | >2-value nominal | Normal distribution | ANOVA method |
| | | Otherwise | Kruskal-Wallis test method |
| Nominal - nominal | N/A | | Chi-square test method |

While calculating correlations, the calculation is based on values of each sample data. For example, regarding the example illustrated in Table 1, (100 degrees, 70) is sample data for the first smelting procedure, (125 degrees, 80) is sample data for the second smelting procedure, and (120 degrees, 75) is sample data for the $N^{th}$ smelting procedure. At this point, sample data for the first to $N^{th}$ smelting procedures can be used for calculating a correlation between electricity consumption and temperature. In order to improve the accuracy of the calculation, the number of sample data can be increased.

In one embodiment of the present invention, the calculating correlations includes: uniformly representing a correlation as a correlation value. It should be noted that since data types of a plurality of attributes differ, different methods need to be used for calculating correlations between attributes of different data types. As a result, evaluation standards for correlations are not uniform, and it is hard to compare correlations represented under various standards. To this end, the present invention provides a method for using correlation values to uniformly represent correlations between attributes of different data types.

In one embodiment of the present invention, correlation values are designed by means of the concept p-value in statistics. In statistics, the p-value represents a decreasing indicator of the reliability of a result. The higher the p-value, the less we can believe that the relation between variables in the sample is a reliable indicator of the relation between the respective variables in the population. Specifically, the p-value represents the probability of error that is involved in accepting an observed result as valid, as "representative of the population." Like the p-value in statistics, a correlation value (ranging between 0 and 1) is used to represent the probability that two attributes have no relation in the present invention. For example, a correlation value of 0.05 between two attributes indicates a 95% probability that these two attributes have relation.

In one embodiment of the present invention, generating a relationship graph using a plurality of attributes and correlations includes: constructing a first node and a second node in a relationship graph by using the first attribute and the second attribute, respectively; when a correlation value representing a correlation between the first attribute and the second attribute is lower than a first threshold, adding an edge between the first node and the second node, where a weight of the edge is the correlation value.

After correlations between attributes are classified as either (performance indicator, intervention) or (performance indicator, confounder) a relationship graph can be constructed using the method described above. During transaction processing, in order to take relatively strong correlations into account as much as possible, a threshold can be set for correlation values, to filter out some insignificant correlations. For example, the threshold may be set to 0.05, which indicates that only correlations with a 95% or above probability that two attributes have correlation are taken into account.

Figure 4A:
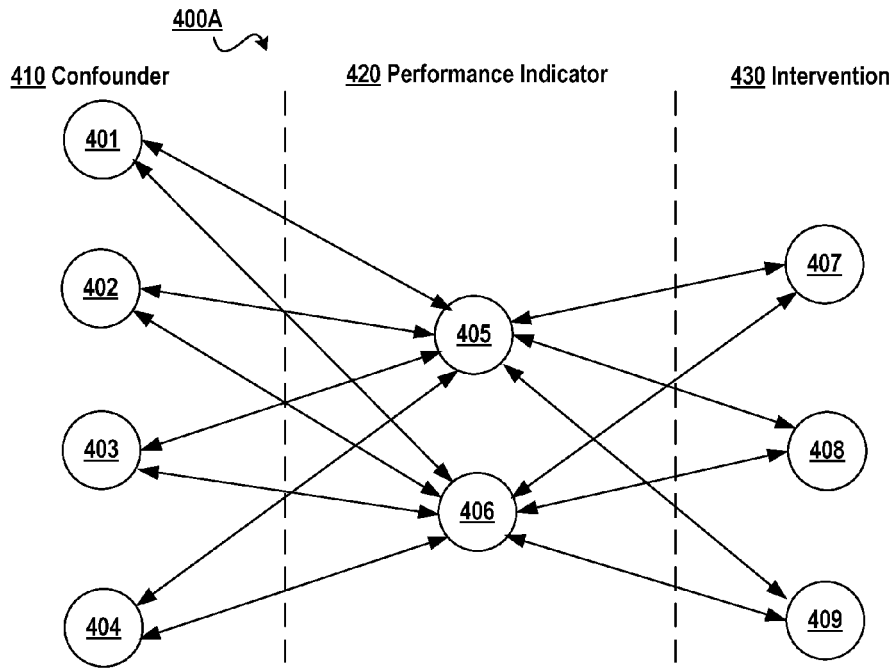
FIG. 4A is a schematic diagram showing a relationship graph in an embodiment of the present invention.
Figure 4B:
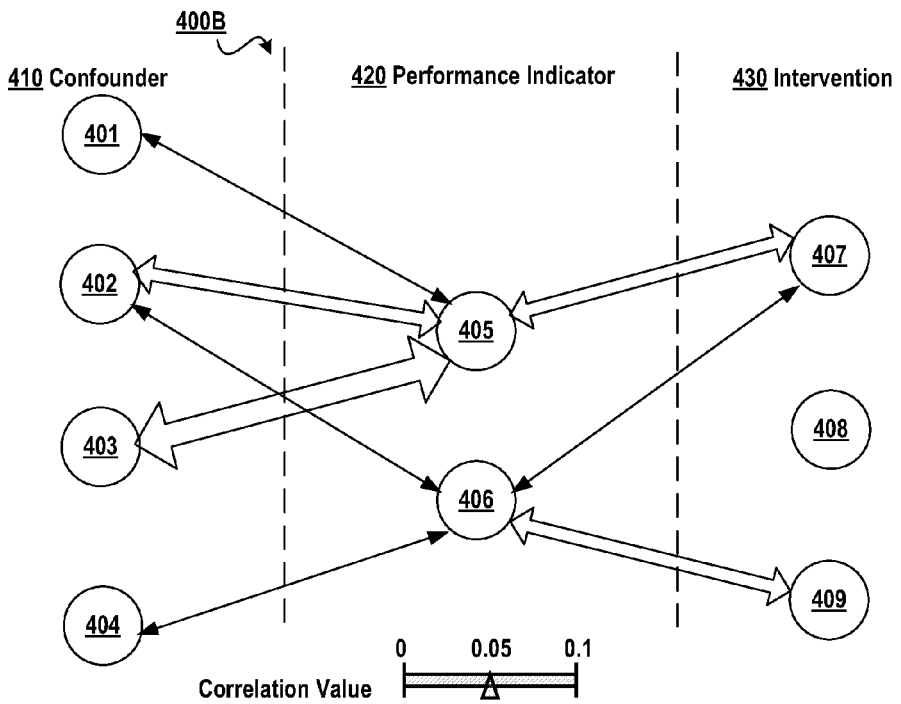
FIG. 4B schematically illustrates a filtered relationship graph in an embodiment of the present invention.

FIG. 4A schematically illustrates relationship graph 400A according to one embodiment of the present invention. As illustrated in FIG. 4A, nodes in relationship graph 400A can be classified into three kinds: attributes represented by nodes 401-404 are classified into intervention, attributes represented by nodes 405 and 406 are classified into performance indicator, and attributes represented by nodes 407-409 are classified into confounder. FIG. 4B schematically illustrates a filtered relationship graph 400B according to one embodiment of the present invention. FIG. 4B illustrates a relationship graph filtered using a threshold of 0.05, where a weight of an edge between two nodes is a correlation of attributes represented by these two nodes. A thick or thin arrow represents a strong or weak correlation; the less a weight, the higher a correlation.

In one embodiment, extracting a sub-graph from the relationship graph to represent a hypothesis includes: for each node i that represents a classification of intervention, obtaining a set O of at least one node that is linked with the node i and that represents a classification of performance indicator; obtaining a set I of nodes other than the node i that are linked with the node i and that represent a classification of intervention; obtaining a set C of all nodes that are linked with the node i and that represent a classification of confounder; and generating a hypothesis as <performance indicator=O, intervention={i}, confounder=C I>. It should be noted that in one embodiment of the present invention, to be "linked" is not limited to the presence of an edge directly connected between two nodes, but can include the presence of a path between two nodes. In other words, to be "linked" can include connecting two nodes by one edge or a plurality of consecutively connected edges.

Figure 5:
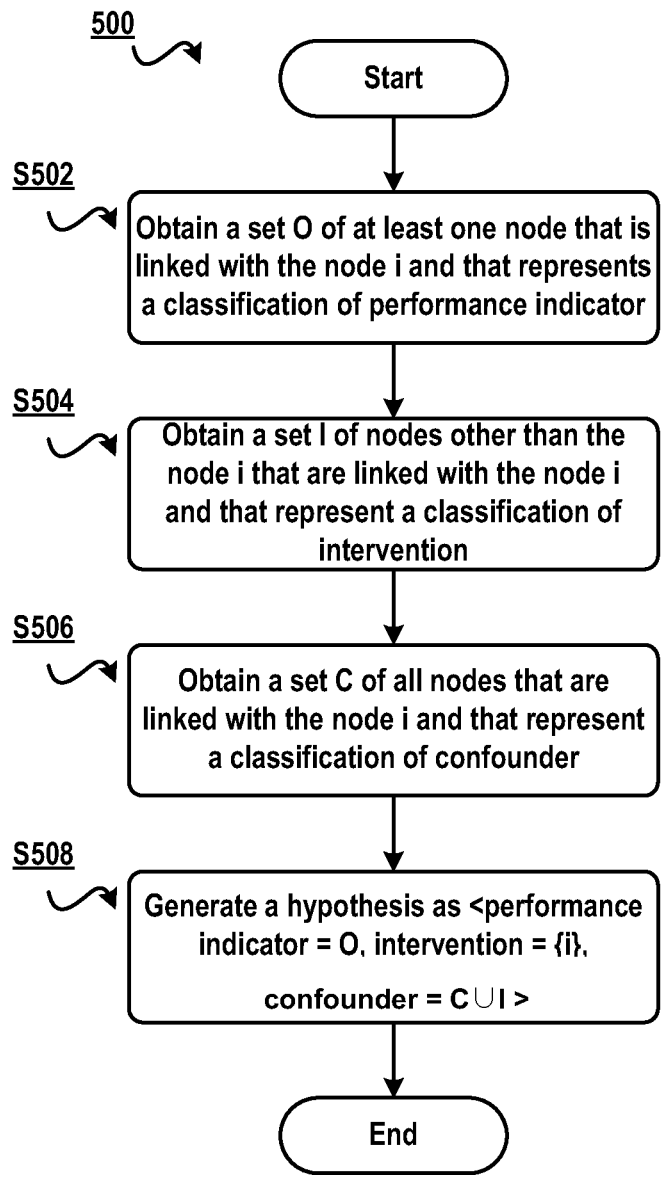
FIG. 5 is a schematic diagram showing a flowchart of a method for extracting a sub-graph from a relationship graph in an embodiment of the present invention.
Figure 6A:
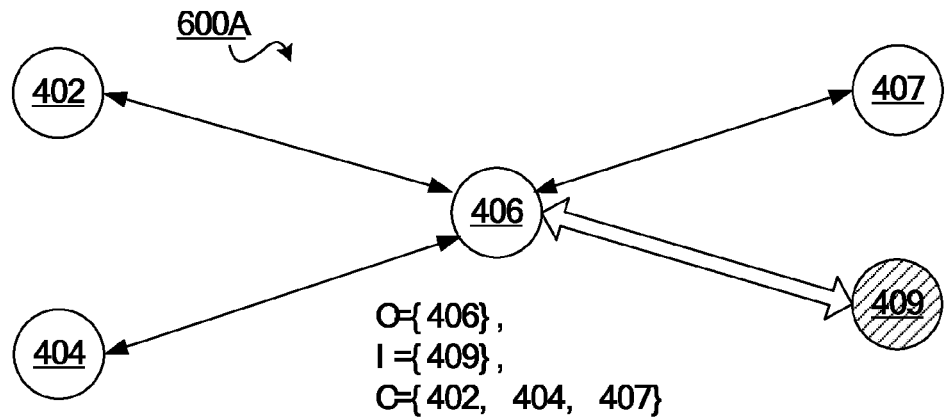
FIGS. 6A-6C is a schematic diagram showing a sub-graph extracted from a relationship graph in an embodiment of the present invention, respectively.
Figure 6B:
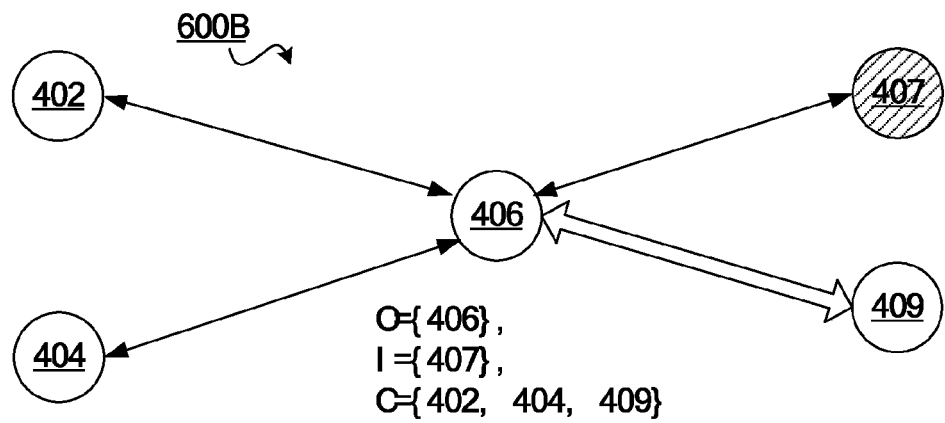
Figure 6C:
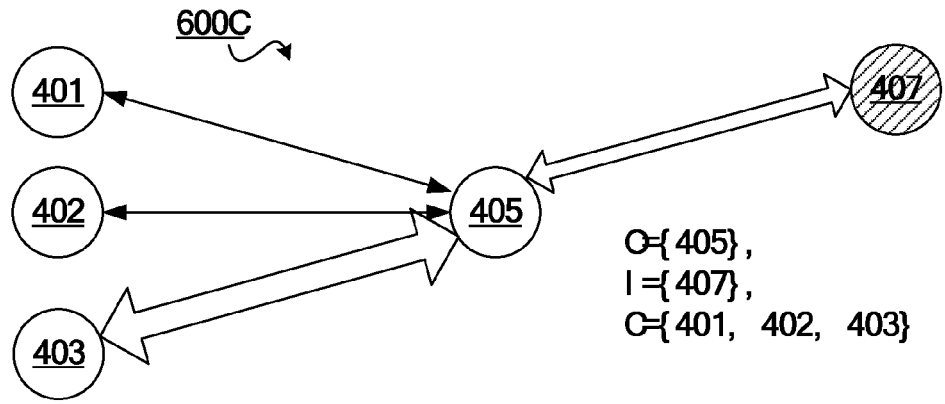

FIG. 5 schematically illustrates flowchart 500 of a method for extracting a sub-graph from a relationship graph according to one embodiment of the present invention. Specifically, FIG. 5 illustrates operations for each node i representing a classification of intervention, while FIGS. 6A-6C schematically illustrates extracting sub-graphs 600A-600C from a relationship graph according to one embodiment of the present invention, respectively. Detailed description will show how to extract a sub-graph in conjunction with steps in FIG. 5 and sub-graphs illustrated in FIGS. 6A-6C. It should be noted that a sub-graph is extracted from the filtered relationship graph 400B illustrated in FIG. 4B. FIG. 5 illustrates operations for each node i representing a classification of intervention as seen below.

In step S502, a set O of at least one node that is linked with the node i and that represents a classification of performance indicator is obtained. For node 409 in FIG. 6A (corresponding to the node i in FIG. 5), a set O={406} of at least one node is linked with node 409 and that represents a classification of performance indicator.

In step S504, a set I of nodes other than the node i that are linked with node i and that represents a classification of intervention. A set I={407} of other nodes than the node i that are linked with the node 409 and that represent a classification of intervention is obtained.

In step S506, a set C of all nodes that are linked with node i and that represent a classification of confounder is obtained. At this point, a set C={402, 404} of all nodes that are linked with the node 409 and that represent a classification of confounder is obtained.

In step S508, a hypothesis is generated as <performance indicator=O, intervention={i}, confounder=C I>. The generated hypothesis is:

Hypothesis 1=
<Performance indicator={406},
Intervention={409},
Confounder={402, 404, 407}>

With the method as illustrated in FIG. 5, when processing is directed to node 407 that represents a classification of intervention, the generated hypothesis is:

Hypothesis 2=
<performance indicator={406},
Intervention={407},
Confounder={402, 404, 409}>,
And
Hypothesis 3=
<Performance indicator={405},
Intervention={407},
Confounder={401, 402, 403}>.

The same attribute can be classified differently in different hypotheses. For example, in hypothesis 1, node 407 is classified as confounder, and node 409 is classified as intervention; in hypothesis 2, however, node 407 is classified as intervention, and node 409 is classified as confounder. This is because in a case of a plurality of interventions, if an intervention is used as a current intervention, with respect to this intervention, other interventions become confounders and thus, are classified as confounder.

In one embodiment of the present invention, the generated hypothesis can be modified. For example, sample data is divided into groups according to values of interventions. In one embodiment, the method includes: selecting an attribute with a classification of intervention as a grouping attribute; and dividing a plurality of samples into a plurality of groups based on the grouping attribute. Sample data can be divided into a plurality of groups. For example, sample data can be divided into two groups with a roughly equal number of samples. In this regard, a threshold (e.g., 10%) can be set, and it is ensured that the difference between the numbers of samples of these two groups does not exceed the threshold.

In the example of zinc smelting, if temperature during smelting is used as an intervention, then interventions can be divided into three groups: high temperature, medium temperature, and low temperature. In the clinical data analysis example, interventions can be divided into groups of conservative treatment and conventional treatment according to daily dosages of insulin. Such groupings have more instructive significance in actual research. When the standard for grouping is vague, grouping can be based on a certain attribute in the sample data. The standard for grouping is to maximize the difference between performance indicators while ensuring a roughly equal number of sample data in each.

In one embodiment of the present invention, the following approach can be adopted for grouping. A certain attribute with a classification of intervention is selected as a grouping attribute (e.g., "temperature" as illustrated in Table 1). A certain value vg within the value range {v1, v2, . . . vn} of this attribute can be selected. If this attribute's data type is scale, then sample data with an attribute value of f≤vg is divided into a first group, while sample data with an attribute value of f>vg is divided into a second group. If this attribute's data type is non-scale (e.g., nominal or ordinal), then the sample data with an attribute value of f=vg is divided into a first group, while sample data with an attribute value of f≠vg is divided into a second group. Grouping is directed to each attribute value within the value range {v1, v2, . . . vn} of the grouping attribute, to find a group that has the strongest correlation with the performance indicator. A hypothesis is generated using sample data in the group according to the method described above.

In one embodiment of the present invention, when a primary purpose of research is to evaluate the impact of an intervention on a performance indicator, confounders that are irrelevant to the intervention can be deleted to simplify calculation and focus the research on analyzing the impact of the intervention on the performance indicator. If a certain confounder is irrelevant to an intervention, no matter what control value is adopted, the impact of the confounder on an outcome is fixed. The confounder can be ignored when evaluating impacts of different interventions on a performance indicator. For example, the method according to one embodiment of the present invention can include: for each attribute j with a classification of confounder, calculating a correlation between the grouping attribute and the attribute j; and deleting the attribute j if a correlation value is greater than a second threshold.

Figure 7A:
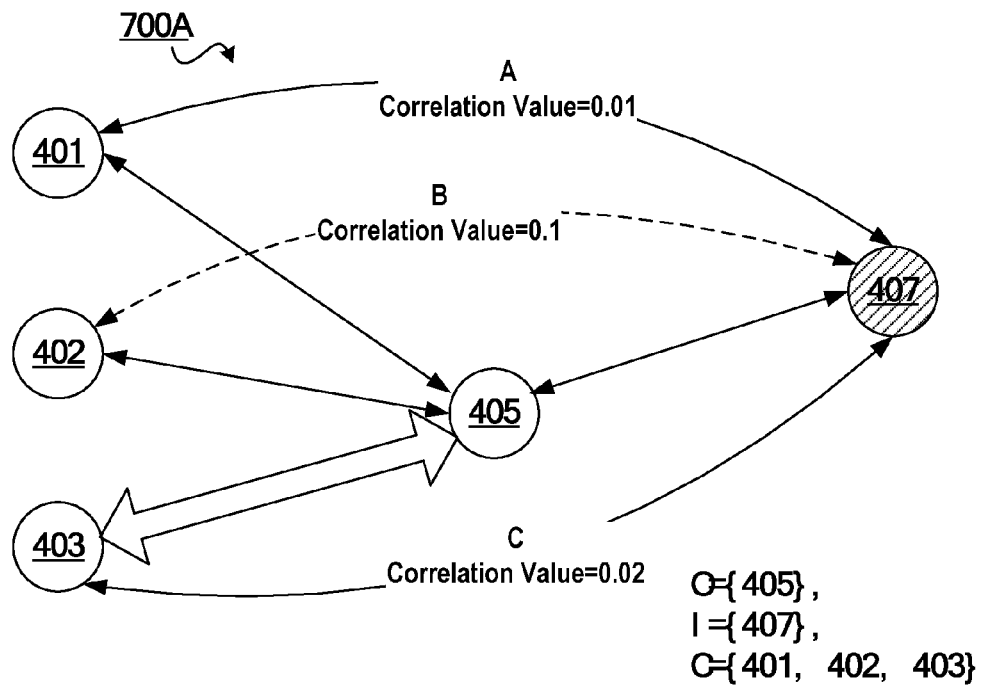
FIG. 7A is a schematic diagram showing a to-be-optimized relationship graph in an embodiment of the present invention.
Figure 7B:
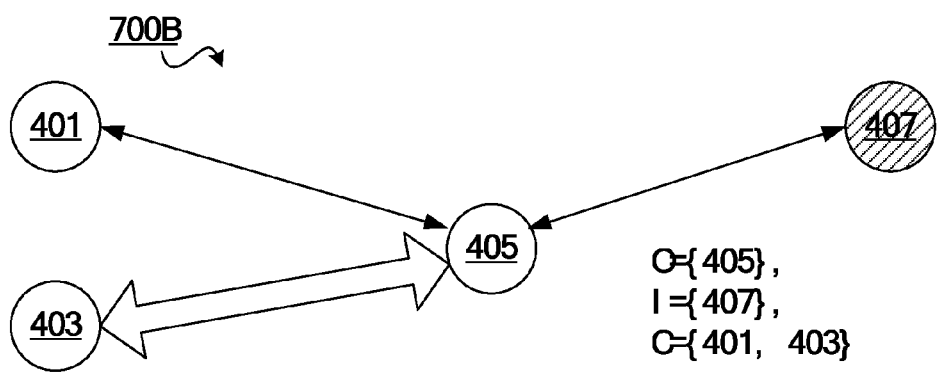
FIG. 7B is a schematic diagram showing an optimized relationship graph in an embodiment of the present invention.

Referring now to FIGS. 7A and 7B, a detailed depiction is presented. FIG. 7A schematically illustrates a to-be-optimized relationship graph 700A according to one embodiment of the present invention, and FIG. 7B schematically illustrates an optimized relationship graph 700B according to one embodiment of the present invention. Relationship graph 700A is a relationship graph that is generated after grouping by using attribute 407 as a grouping attribute. Correlation values between grouping attribute 407 and each of confounders 401, 402, and 403 are calculated, respectively (illustrated by arrows A, B and C, respectively). Judgment is made as to whether or not the correlation values are greater than a second threshold (e.g., 0.05):

Correlation value A=0.01<0.05, so keep attribute 401;
Correlation value B=0.01>0.05, so delete attribute 402; and
Correlation value C=0.02<0.05, so keep attribute 403.

After attribute 402 is deleted, the relationship graph is as illustrated in FIG. 7B. By calculating correlation values between confounders and a grouping attribute, a confounder that has a weak correlation to the grouping attribute can be discarded so as to optimize the relationship graph. For the example illustrated in Table 2, when "type of insulin" is selected as a classification attribute, the foregoing calculation results in that the attribute "age" has a weak correlation to the classification attribute, so the attribute "age" can be deleted. That is, "age" is no longer regarded as a confounder.

In one embodiment of the present invention, the transaction processing is a metallic smelting procedure or clinical data analysis. Although a metallic smelting procedure and clinical data analysis are used as concrete examples throughout the specification of the present invention, the application scope of the method and apparatus of the present invention is not limited thereto. For example, the above method is applicable to any metallic smelting by means of wet smelting. For another example, regarding a multitude of factors involved in software research and development (R&D), such as R&D cycle, R&D cost, amount of code, number of R&D personnel, age, education, gender, etc., the method and apparatus proposed by the present invention can also be used for data processing so as to generate a hypothesis on software research and development. The method and apparatus of the present invention can be applied to various application environments where there is a need to analyze impacts of various factors on transaction processing so as to establish a hypothesis.

Figure 8:
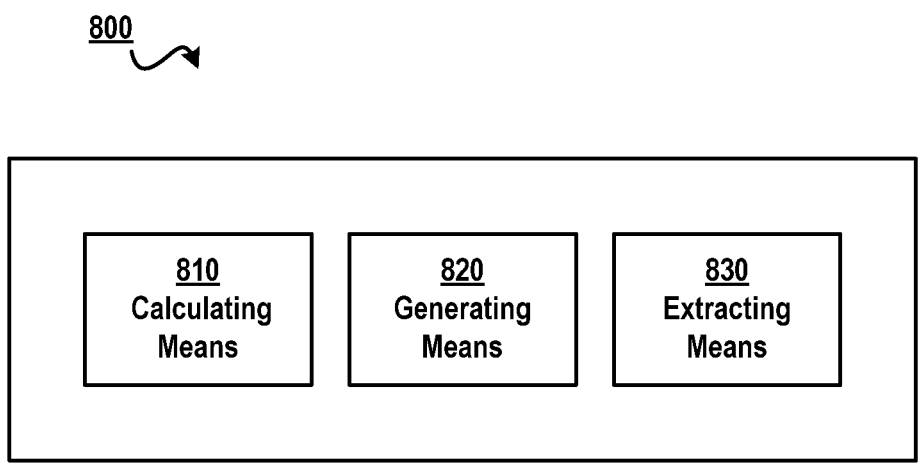
FIG. 8 is a schematic diagram showing a schematic diagram of an apparatus for data processing in an embodiment of the present invention.

FIG. 8 schematically illustrates a diagram 800 of an apparatus for data processing according to one embodiment of the present invention. As illustrated in FIG. 8, the apparatus for data processing according to one embodiment of the present invention includes: calculating means 810 configured to calculate correlations between a plurality of attributes in a dataset, the attributes being factors involved in transaction processing; generating means 820 configured to generate a relationship graph by using the plurality of attributes and the correlations between the plurality of attributes; and extracting means 830 configured to extract a sub-graph from the relationship graph to represent a hypothesis, where the hypothesis describes impacts of the factors on the transaction processing.

In one embodiment of the present invention, classifications of the attributes includes: performance indicator, intervention, and confounder; and data types of the attributes include at least one of scale, nominal, and ordinal.

In one embodiment of the present invention, calculating means 810 includes: means configured to calculate a correlation between an attribute with a classification of performance indicator, and an attribute with a classification of intervention; and means configured to calculate a correlation between an attribute with a classification of performance indicator, and an attribute with a classification of confounder.

In one embodiment of the present invention, calculating means 810 includes: a first and a second attribute among the plurality of attributes, means configured to calculate a correlation based on a value of the first attribute and a value of the second attribute in each of a plurality of samples.

In one embodiment of the present invention, the means configured to calculate correlations includes: means configured to uniformly represent a correlation as a correlation value.

In one embodiment of the present invention, generating means 820 includes: means configured to construct a first node and a second node in the relationship graph by using the first attribute and the second attribute, respectively; means configured to add an edge between the first node and the second node when a correlation value representing a correlation between the first attribute and the second attribute is lower than a first threshold, where a weight of the edge is the correlation value.

In one embodiment of the present invention, extracting means 830 includes: for each node i that represents a classification of intervention, means configured to obtain a set O of at least one node that is linked with the node i and that represents a classification of performance indicator; means configured to obtain a set I of nodes other than the node i that are linked with the node i and that represent a classification of intervention; means configured to obtain a set C of all nodes that are linked with the node i and that represent a classification of confounder; and means configured to generate a hypothesis as <performance indicator=O, intervention={i}, confounder=C I>.

In one embodiment of the present invention, the apparatus includes: means configured to select an attribute with classification of intervention as a grouping attribute; and divide the plurality of samples into a plurality of groups based on the grouping attribute.

In one embodiment of the present invention, the apparatus includes: for each attribute j with classification of confounder, means configured to calculate a correlation between the grouping attribute and the attribute j; and means configured to delete the attribute j if a correlation value is greater than a second threshold.

In one embodiment of the present invention, the apparatus includes: means configured to add metadata to the plurality of attributes so as to pre-process the plurality of attributes.

In one embodiment of the present invention, the transaction processing is a metallic smelting procedure or clinical data analysis.

The present invention can be implemented in software, hardware or combination of software and hardware. In a preferred embodiment, the present invention is implemented as software, including, without limitation to, firmware, resident software, micro-code, etc.

The present invention can be implemented as a computer program product accessible by computer-usable or computer-readable media that provides program code for use by or in connection with a computer or any instruction executing system. For the purpose of description, a computer-usable or computer-readable medium can be any tangible means that can contain, store, communicate, propagate, or transport the program for use by or in connection with an instruction execution system, apparatus, or device.

The medium can be an electric, magnetic, optical, electromagnetic, infrared, semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CD-R/W), and DVD.

A data processing system adapted for storing and/or executing program code according to embodiment of the present invention will include at least one processor that is coupled to a memory element directly or via a system bus. The memory element can include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) can be coupled to the system directly or via an intermediate I/O controller.

A network adapter can also be coupled to the system such that the data processing system can be coupled to other data processing systems, remote printers, or storage devices via an intermediate private or public network. A modem, a cable modem, and an Ethernet card are merely examples of a currently available network adapter.

It should be understood from the foregoing description that various modifications and alterations can be made to the embodiments of the present invention without departing from the present invention. The description presented in this specification is merely for the purpose of illustration and should not be construed as limiting. The scope of the present invention is only defined by the appended claims.

The invention claimed is:

1. A method for data processing, comprising:
    calculating correlations between a plurality of attributes in a dataset, the attributes being factors involved in transaction processing;
    generating a relationship graph by using the plurality of attributes and the correlations between the plurality of attributes; and
    extracting a sub-graph from the relationship graph to represent a hypothesis;
    wherein the hypothesis describes impacts of the factors on the transaction processing:
    wherein the attributes further comprise a performance indicator, an intervention, and a cofounder; and wherein data types of the attributes comprising at least one of scale, nominal, and ordinal.

2. The method according to claim 1, wherein the calculating correlations between a plurality of attributes in a dataset further comprises:
calculating a correlation between an attribute with a classification of performance indicator and an attribute with a classification of intervention; and
calculating a correlation between an attribute with a classification of performance indicator and an attribute with a classification of confounder.

3. The method according to claim 1, wherein the calculating correlations between plurality of attributes in a dataset further comprises:
a first and a second attribute among the plurality of attributes, which as being used to calculate the correlations based on a value of the first attribute and a value of the second attribute in each of a plurality of samples.

4. The method according to claim 3, wherein the calculating correlations comprising: uniformly representing correlations as correlation values.

5. The method according to claim 4, wherein generating a relationship graph by using a plurality of attributes and the correlations between the plurality of attributes further comprises:
constructing a first node and a second node in the relationship graph by using the first attribute and the second attribute, respectively;
adding an edge between the first node and the second node when a correlation value representing a correlation between the first attribute and the second attribute is lower than a first threshold, wherein a weight of an edge is the correlation value.

6. The method according to claim 5, wherein extracting a sub-graph from a relationship graph to represent a hypothesis further comprises:
for each node i that represents a classification of intervention,
obtaining a set O of at least one node that is linked with the node i and that represents a classification of performance indicator;
obtaining a set l of nodes other than the node i that are linked with the node i and that represent a classification of intervention;
obtaining a set C of all nodes that are linked with the node i and that represent a classification of confounder; and
generating a hypothesis as <performance indicator=O, intervention={i}, confounder=C Ul>.

7. The method according to claim 3, further comprising:
selecting an attribute with a classification of intervention as a grouping attribute; and
dividing a plurality of samples into a plurality of groups based on the grouping attribute.

8. The method according to claim 7, further comprising:
an attribute j with a classification of confounder,
calculating a correlation between a grouping attribute and the attribute j; and
deleting the attribute j if a correlation value is greater than a second threshold.

9. The method according to claim 1, further comprising adding metadata to a plurality of attributes to pre-process the plurality of attributes.

10. The method according to claim 1, wherein the transaction processing is a metallic smelting procedure or a clinical data analysis.

11. An apparatus for data processing, comprising:
means configured to calculate correlations between a plurality of attributes in a dataset, the attributes being factors involved in transaction processing;
means configured to generate a relationship graph by using a plurality of attributes and the correlations between the plurality of attributes; and
means configured to extract a sub-graph from the relationship graph to represent a hypothesis;
wherein the hypothesis describes impacts of the factors on the transaction processing
wherein classifications of the attributes further comprise a performance indicator, an intervention and a confounder; and
wherein data types of the attributes comprise at least one of scale, nominal, and ordinal.

12. The apparatus according to Claim 11, wherein the means configured to calculate correlations between a plurality of attributes in a dataset further comprises:
means configured to calculate a correlation between an attribute with a classification of a performance indicator and an attribute with a classification of an intervention; and
means configured to calculate a correlation between an attribute with a classification of the performance indicator and an attribute with a classification of the confounder.

13. The apparatus according to claim 11, wherein the means configured to calculate correlations between a plurality of attributes in a dataset further comprises:
for a first and a second attribute among the plurality of attributes, means configured to calculate the correlations based on a value of the first attribute and a value of the second attribute in each plurality of samples.

14. The apparatus according to claim 13, wherein the means configured to calculate correlations further comprises:
means configured to uniformly represent correlations as correlation values.

15. The apparatus according to claim 14, wherein the means configured to generate a relationship graph by using a plurality of attributes and the correlations between the plurality of attributes further comprises:
means configured to construct a first node and a second node in the relationship graph by using the first attribute and the second attribute, respectively;
means configured to add an edge between the first node and the second node when a correlation value representing a correlation between the first attribute and the second attribute is lower than a first threshold, wherein the weight of the edge is the correlation value.

16. The apparatus according to claim 15, wherein the means configured to extract a sub-graph from a relationship graph to represent a hypothesis further comprises:
for each node i that represents a classification of intervention,
means configured to obtain a set O of at least one node that is linked with the node i and that represents a classification of a performance indicator;
means configured to obtain a set l of nodes other than the node i that are linked with the node i and that represent a classification of an intervention;
means configured to obtain a set C of all nodes that are linked with the node i and that represent a classification of a confounder; and
means configured to generate a hypothesis as <performance indicator=O, intervention={i}, confounder=C Ul>.

17. The apparatus according to claim 13, further comprising:
　means configured to select an attribute with a classification of intervention as a grouping attribute; and
　means configured to divide a plurality of samples into a plurality of groups based on the grouping attribute.

18. The apparatus according to claim 17, further comprising:
　for each attribute j with a classification of confounder,
　means configured to calculate a correlation between a grouping attribute and the attribute j; and
　means configured to delete the attribute j if the correlation value is greater than a second threshold.

19. The apparatus according to claim 11, further comprising: means configured to add metadata to a plurality of attributes so as to pre-process the plurality of attributes.

20. The apparatus according to claim 11, wherein the transaction processing is a metallic smelting procedure or a clinical data analysis.

21. A method for data processing, comprising:
　calculating correlations between a plurality of attributes in a dataset, the attributes being factors involved in transaction processing;
　generating a relationship graph by using the plurality of attributes and the correlations between the plurality of attributes;
　extracting a sub-graph from the relationship graph to represent a hypothesis, wherein the hypothesis describes impacts of the factors on the transaction processing; and
　adding metadata to a plurality of attributes to pre-process the plurality of attributes.

* * * * *